United States Patent [19]

Nakano et al.

[11] Patent Number: 4,744,002
[45] Date of Patent: May 10, 1988

[54] COMPACT-TYPE GAS-INSULATED SWITCHGEAR APPARATUS

[75] Inventors: Haruji Nakano, Hitachiota; Kazuaki Oishi, Hitachi, both of Japan

[73] Assignee: Hitachi, Ltd., Tokyo, Japan

[21] Appl. No.: 32,593

[22] Filed: Apr. 1, 1987

[30] Foreign Application Priority Data

Apr. 1, 1986 [JP] Japan ................................. 61-72437

[51] Int. Cl.⁴ ............................................. H02B 1/04
[52] U.S. Cl. .................................... 361/341; 361/333; 361/335; 200/148 B
[58] Field of Search ................ 200/48 R, 148, 148 R, 200/148 B, 148 D, 148 F, 148, 50 AA; 361/332, 333, 335, 341, 376, 378, 429

[56] References Cited

U.S. PATENT DOCUMENTS

| 3,564,344 | 2/1971 | Boersma | 361/341 |
| 4,262,323 | 4/1981 | Yoshida | 361/341 |
| 4,468,716 | 8/1984 | Kamata | 361/333 |

FOREIGN PATENTS DOCUMENTS 60-187213  9/1985  Japan.

Primary Examiner—G. P. Tolin
Attorney, Agent, or Firm—Antonelli, Terry & Wands

[57] ABSTRACT

A compact-type gas-insulated switchgear apparatus is disclosed, in which movable contacts of a disconnector and a ground switch arranged in a cable head casing are adapted for switching operation in parallel to the axis of the cable head casing. A connecting conductor connecting stators of the disconnector and the ground switch is arranged in a position perpendicular to the axis of the cable head casing. A connecting opening is formed in the side wall of the cable head casing at a part thereof corresponding to the end of the connecting conductor. It is thus not necessary to increase the diameter of the cable head casing for the movable contacts of the disconnector and the ground switch performing substantially parallel operation, and other electrical equipment may be connected along the extention of the connecting conductor connecting the stators of the disconnector and the ground switch without modifying the cable head casing.

3 Claims, 3 Drawing Sheets

COMPACT-TYPE GAS-INSULATED SWITCHGEAR APPARATUS

BACKGROUND OF THE INVENTION

1. FIELD OF THE INVENTION

The present invention generally relates to a compact-type gas-insulated switchgear apparatus, or more in particular to a compact-type gas-insulated switchgear apparatus with a compact cable head casing easily connectable with other electrical equipments.

2. DESCRIPTION OF THE PRIOR ART

In conventional compact-type gas-insulated switchgear apparatuses, as disclosed in JP-A-60-187213, openings connectable with circuit breaker terminals are formed in different directions at the ends of a circuit breaker casing, and one of the openings is connected to a main bus, with the other opening to a cable head terminal device. This terminal device has a disconnector and a ground switch in the cable head casing. A selected one of the disconnector and the ground switch is equipped with a moving element (needle) switchable in the direction perpendicular to the axis of the cable head casing, and the other has a moving element switchable in the direction parallel to the axis of the cable head casing.

In the above-described compact-type gas-insulated switchgear apparatus comprising a disconnector and a ground switch incorporated in a casing containing a cable head, the configuration of the disconnector and the ground switch described above makes it difficult to form a connector opening to the cable head casing for connecting other power equipment such as a lightning device. If the lightning device is to be connected, it is necessary to replace with a cable head casing large in axial length to form a connector opening corresponding to the increase in axial length. Another method may be to incorporate the lightning device integrally in the cable head casing. According to this method, however, the diameter of the cable head casing undesirably increases, in any of the these configurations, the units of the switchgear apparatus of this type are connected to other electrically equipment differently depending on whether they are connected to a transformer or a transmission line. Therefore, common components have preferably a standard configuration regardless of the connecting conditions so as to be connectable with other electrical equipments according to particular conditions.

SUMMARY OF THE INVENTION

An object of the present invention is to provide a compact-type gas-insulated switchgear apparatus obviating the above-mentioned various disadvantages.

Another object of the present invention is to provide a compact-type gas-insulated switchgear apparatus connectable with other electrical equipment without increasing the size of a cable head casing.

Still another object of the present invention is to provide a compact-type gas-insulated switchgear apparatus with a reduced size of the cable head casing minimizing the installation space of the apparatus.

In order to achieve the above-mentioned objects, according to the present invention, there is provided a compact-type gas-insulated switchgear apparatus in which the moving elements (needles) of a disconnector and a ground switch incorporated in a cable head casing are adapted to operate in parallel to the axial direction of the cable head casing, a connecting conductor for connecting the stators of the ground switch and the disconnector is arranged at right angles to the axis of the cable head casing, and a connecting opening is formed in the side wall of the cable head casing at a part corresponding to the end of the connecting conductor.

According to the compact-type gas-insulated switchgear apparatus of the present invention configured as above, the substantially parallel operation of the needles (moving elements) of the disconnector and the ground switch eliminates the need of increasing the diameter of the cable head casing on the one hand, and the fact other electrical equipment can be connected in the direction along the extension of the connecting conductor connecting the stators of the disconnector and the ground switch makes it possible to connect the other electrical equipment without changing the cable head casing on the other hand.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

An embodiment of the present invention will be explained in detail below with reference to the accompanying drawings.

Figure 1:
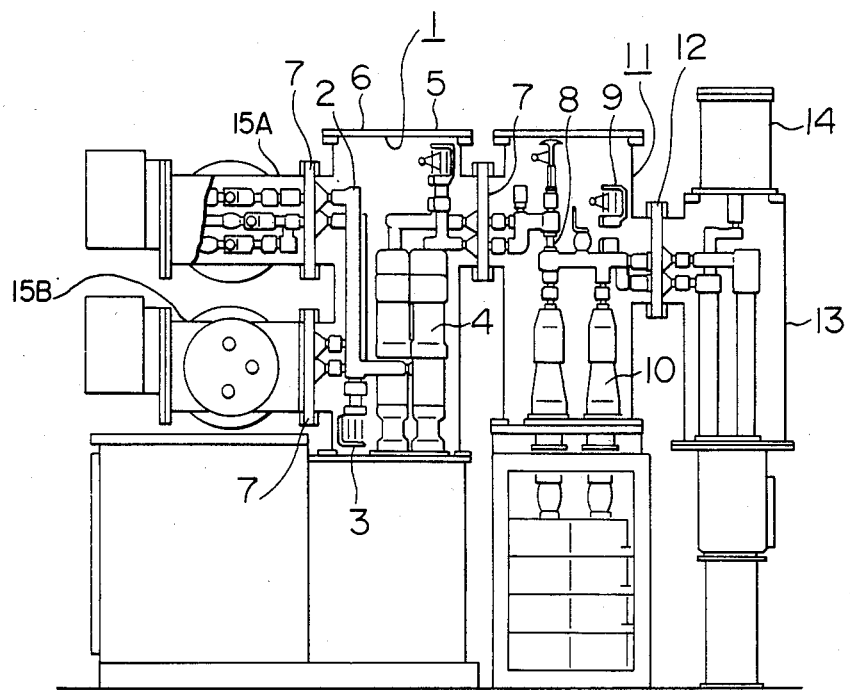
FIG. 1 is a longitudinal front sectional view of a compact-type gas-insulated switchgear apparatus according to an embodiment of the present invention.

FIG. 1 is a front view showing a unit of a compact-type gas-insulated switchgear apparatus of three-phase collective type for double main bus system.

A circuit breaker 1 includes a breaker 4 arranged in a cylindrical casing 5 coaxially therewith. A bus-side connecting conductor 2 connected to the lower terminal of the breaker 4 is arranged substantially in parallel to the breaker 4 in biased manner leftward of the cylindrical casing 6. This bus-side connecting conductor 2 is connected through an insulating spacer 7 to main buses 15A, 15B respectively juxtaposed vertically along the axis of the cylindrical casing 6. A ground switch 3 is arranged, on the other hand, in the casing at the lower end of the bus-side connecting conductor 2 and is adapted to be energized by a drive unit not shown. The upper terminal of the breaker 4, on the other hand, is extended into the cable head casing 11 through the insulating spacer 7 and grounded by the ground switch in the cylindrical casing 6. This ground switch 3 also operated by a drive unit not shown. As seen from this diagram, the casing 6 of the breaker 1 according to the present invention has a pair of connecting openings shut by an insulating spacer 7 at upper and lower parts on the left side and one upper connecting opening shut by the insulating spacer 7 on the right side.

The cable head casing 11 connected in parallel to the casing 6 includes a left casing 6, a connecting opening shut by the insulating spacer 7, and another connecting opening on the right side shut by the insulating spacer 12. As seen from the drawing, the right connecting opening is positioned slightly lower than the left connecting opening. This cable head casing 11 holds therein a cable head 10 arranged at an axial end thereof, and a cable is led out of the lower end of the cable head casing 11 and connected to a transformer or a transmission line. A circuit breaker 8 and a ground switch 9 are also arranged in the cable head casing 11.

Figure 2:
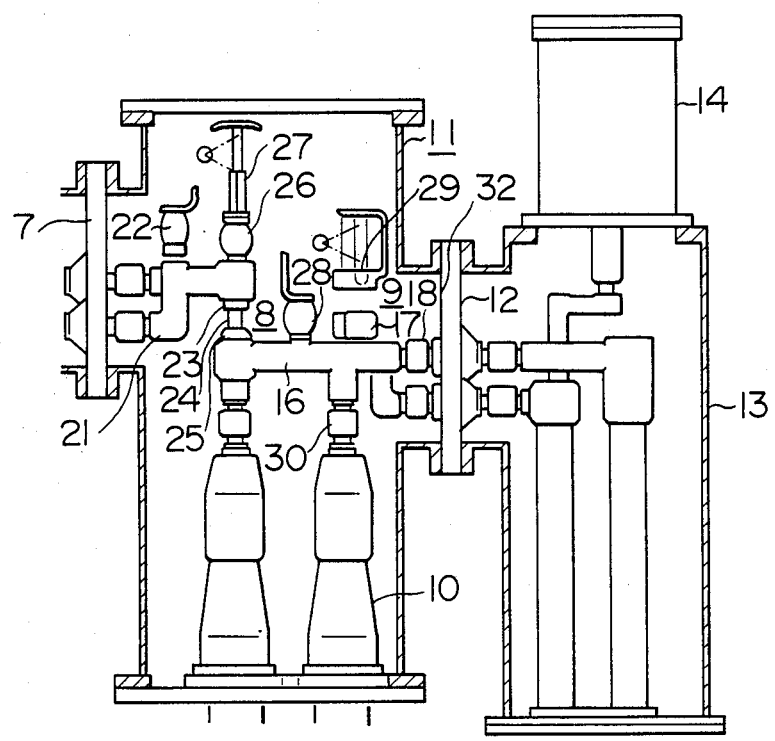
FIG. 2 is an enlarged view of the essential parts included in FIG. 1.

FIG. 2 shows the essential parts, especially, the cable head casing 11 of the compact-type gas-insulated switchgear apparatus shown in FIG. 1.

In FIG. 2, a conductor 21 connected to the breaker 4 through the insulating spacer 7 is supported on an insulating member 22 fixed on an appropriate wall surface part of the cable head casing 11, and has an end thereof mounted with a needle-side collector 23. A movable contact 24 of the breaker 8, while normally maintaining contact with the collector 23, is adapted to vertically operate along an axis parallel to the axis of the cable head casing 11 through a drive unit not shown, a link device 27 and an insulating member 26. The stator 25 which makes and breaks with the movable contact 24 by this switching operation of the latter is mounted on a connecting conductor 16. The connecting conductor 16 is arranged on a plane substantially perpendicular to central axis of the cable head casing 11, and fixed on the appropriate part of the inner wall surface of the cable head casing 11 through the insulating member 28. The extreme right end of the connecting conductor 16 is connected through the collector 18 to the central conductor of the insulating spacer 12. The stator 17 of the ground switch 9 and the collector 30 are mounted midway of the connecting conductor 16. A movable contact 29 opposedly arranged to the stator 17 is adapted to perform the switching operation along an axis parallel to the center line of the cable head casing 11 by a drive unit not shown to make and break with the stator 17. In this way, the disconnector 8 and the ground switch 9 are juxtaposed to perform the switching operation vertically along an axis substantially parallel to the center line of the cable head casing 11. This arrangement is made possible by arranging the connecting conductor 16 in a plane perpendicular to the center line of the cable head casing 11. The collector 30 mounted on the connecting conductor 16 is connected to the cable head 10.

The end of the connecting conductor 16 opposite to the disconnector, that is, the cable head casing 11 corresponding to the right end thereof is formed with a connecting opening 32, which is sealed with the casing 13 through the insulating spacer 12. Even if this connecting opening 32 is formed in the cable head casing 11, therefore, the arrangement of the connecting conductor 16 does not require an increased axial length thereof, or the disconnector 8, the ground switch 9, or the link device or drive unit thereof is not adversely affected. The casing 13 has arranged therein such a device as a lightning element to make up electrical equipment including the lightning device. An instrumentation transformer may also be connected as required.

This connection and configuration permits the same construction of the cable head casing 11 and the internal basic configuration regardless of whether the cable is connected to a transformer or a transmission line, thereby making it possible to make the most of the space in the cable head casing 11 for a reduced size of the apparatus.

Figure 3:
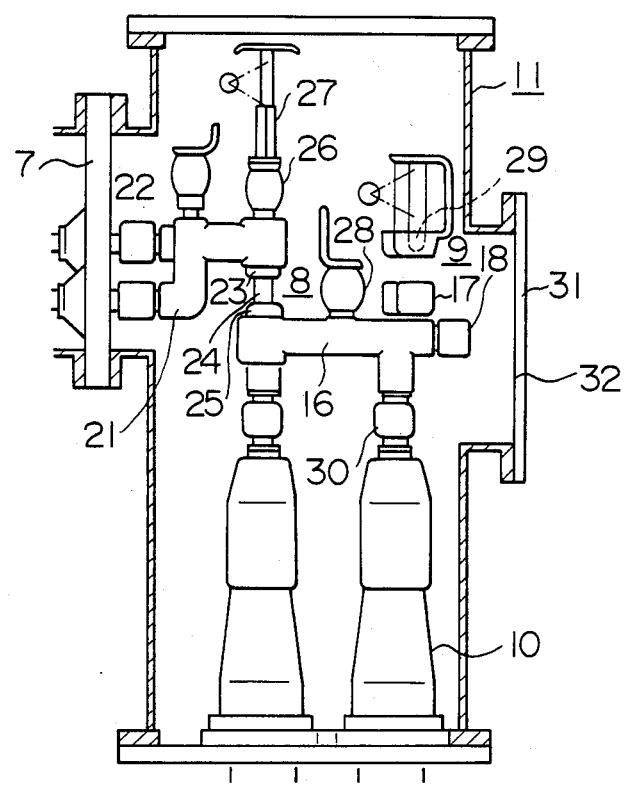
FIG. 3.is an enlarged view of the essential parts according to another embodiment of the present invention.

FIG. 3 shows the essential parts of another embodiment of the invention shown in FIG. 1. In FIG. 3, the apparatus may be connected in the shown manner since the lightning device is not necessary if the cable is connected to a transformer.

Specifically, in FIG. 3, the insulating spacer 12 and the casing 13 of the lightning device are removed, and the right connecting opening 32 of the cable head casing 11 is removably sealed by a lid 31. A collector 18 for connection with other electrical equipment is provided to the extreme right of the connecting conductor 16. The standard configuration up to this point may lack the collector 18, and an exclusive form may be used at the right end of the connecting conductor 16 without collector 18 mounted thereon.

It will thus be understood from the foregoing description that according to the present invention, a cable head casing connected to an end of a circuit breaker has arranged therein a disconnector and a ground switch having needles for performing the switching operation along two different axes substantially parallel to the center line of the cable head casing. A connecting conductor mounted with stators of the disconnector and the ground switch is arranged in a plane substantially perpendicular to the center line of the cable head casing, and a connecting opening is formed in the cable head casing at the end of the connecting conductor opposite to the disconnector, so that the breaker or the ground switch does not form any stumbling block even if other electrical equipment is connected to the connecting opening on the one hand and the connections are possible without increasing the size of the cable head casing on the other hand.

We claim:

1. A compact-type gas-insulated switchgear apparatus comprising a circuit breaker including a vertical cylindrical casing including arranged therein a breaker on the same axis as the cylindrical casing and a bus-side connecting conductor connected to a lower terminal of the breaker and arranged substantially in parallel to the breaker, a cylindrical cable head casing connected to an upper terminal of the breaker through an insulating spacer and including a disconnector, a ground switch and a cable head, and main buses connected to the bus-side connecting conductor through a second insulating spacer and juxtaposed vertically along the axis of the cylindrical casing;

wherein said disconnector and the ground switch include movable contacts respectively operated through a link device from an axial end of the cable head casing to perform the switching operation along different axes parallel to the center line of the cable head casing, stators arranged opposedly to the movable contacts of the disconnector and the ground switch, and a connecting conductor arranged in a plane substantially perpendicular to the center line of the casing and having mounted thereon said movable contacts and said stators, and a connecting opening is formed in the cable head casing at a part thereof corresponding to the end of the connecting conductor opposite to the disconnector, said cable head being formed at the other axial end of the cable head casing.

2. A compact-type gas-insulated switchgear apparatus according to claim 1, wherein another casing for a lightning device or the like is connected to said cable head casing through the connecting opening covered by a third insulating spacer.

3. A compact-type gas-insulated switchgear apparatus according to claim 1, wherein another casing for a lightning device or the like is connected to the cable head casing through the connecting opening covered by a lid.

* * * * *